United States Patent [19]
Brasky

[11] Patent Number: 4,542,282
[45] Date of Patent: Sep. 17, 1985

[54] HEATING PANEL ASSEMBLY WITH IMPROVED ELECTRICAL CONNECTION MEANS

[76] Inventor: Joseph L. Brasky, 15 Tower Hill Rd., Killingworth, Conn. 06417

[21] Appl. No.: 609,733

[22] Filed: May 14, 1984

Related U.S. Application Data

[63] Continuation-in-part of Ser. No. 351,610, Feb. 23, 1982.

[51] Int. Cl.[4] .......... H05B 1/00; H02G 3/00

[52] U.S. Cl. .......... 219/345; 174/71 R; 174/76; 219/213; 219/541

[58] Field of Search .......... 219/345, 213, 356, 541; 174/71 R, 76

[56] References Cited

U.S. PATENT DOCUMENTS

| | | | |
|---|---|---|---|
| 344,324 | 6/1886 | Munsie | 174/71 R |
| 2,762,896 | 9/1956 | Pendleton | 219/541 |
| 2,827,509 | 3/1958 | Wayman | 174/76 |
| 3,359,361 | 12/1967 | Oakman | 174/76 |
| 3,385,922 | 5/1968 | Rice | 174/76 |
| 3,418,448 | 12/1968 | Pradenas | 219/345 |
| 3,458,648 | 7/1969 | Volker | 174/76 |
| 3,499,972 | 3/1970 | Smith | 174/76 |
| 3,598,960 | 8/1971 | Deacon | 219/345 |
| 3,715,459 | 2/1973 | Hoffman | 174/71 R |
| 3,751,630 | 8/1973 | Brasky | 219/345 |
| 3,771,112 | 11/1973 | Thompson et al. | 174/76 |
| 4,107,451 | 8/1978 | Smith, Jr. et al. | 174/76 |
| 4,301,325 | 11/1981 | Hutchinson | 174/76 |
| 4,370,548 | 1/1983 | Nagasawa et al. | 219/345 |

*Primary Examiner*—Roy N. Envall, Jr.
*Assistant Examiner*—M. M. Lateef
*Attorney, Agent, or Firm*—McCormick, Paulding & Huber

[57] ABSTRACT

An electrical heating panel assembly includes a thin planar panel with a length of electrical resistance wire embedded therewithin and a pair of cold leads projecting from an edge surface. An insulated multiple conductor power line extends along the panel edge surface and has a portion of its outer insulation removed. The cold leads are connected respectively with power line conductors at the insulation free portion of the power line. A U-shaped closure member may be hinged or fixed and has thin flat leg portions which embrace the panel side surfaces adjacent the edge surface. A body portion of the closure member is spaced from the edge surface of the panel to define an open end tubular enclosure for the insulation free power line portion, the cold leads, and the connection therebetween. Means for electrically insulating the cold lead-power line connections comprise a hardenable grout-like material disposed within the tubular enclosure and encapsulating the connections, the material being optionally disposed in a rupturable sausage. Alternatively, power line carrying conduits may be connected at opposite ends of the closure member as by adhesive means, adapters, or threaded connections.

20 Claims, 16 Drawing Figures

HEATING PANEL ASSEMBLY WITH IMPROVED ELECTRICAL CONNECTION MEANS

CROSS REFERENCE TO RELATED APPLICATION

This application is a Continuation-in-Part of U.S. application, Ser. No. 351,610, filed Feb. 23, 1982.

BACKGROUND OF THE INVENTION

Electrical heating panels have been employed for some time to provide radiant heat from ceilings and other surfaces in rooms and other zones requiring heat. When used as ceiling heating panels, the configuration and dimensions of the panels are generally established to allow the panels to fit between ceiling rafters or joists. The panels may be of varying length and are generally rectangular in configuration with finish ceiling panels disposed therebeneath. Suspension straps or other means may be employed in the installation of the heating panels in close proximity to the finish ceiling panels and insulation is generally provided above the heating panels.

The panels have resistance wire such as Nichrome embedded therein as, for example, in a sinusoidal configuration, and cold leads extend from the resistance wire for connection of the panels with an electrical power source. Preferably, the panels are connected in parallel with the power source and may of course operate under the control of conventional thermostats or the like.

Heating panels of the type mentioned have gained wide acceptance and have been generally satisfactory with regard to their installation and use. Problems have been encountered, however, in the installation of such panels and, more specifically, in effecting the necessary connections between the cold leads of the panels and the conductors of a power line extending from the source of electrical power. The desired ease and convenience in effecting and in properly insulating such connections has not been achieved. For example, in my U.S. Pat. No. 3,751,630 entitled RADIANT PANEL HEATING SYSTEM, issued Aug. 7, 1973, a somewhat unwieldy line connection system is disclosed. The on-site electrical connections cannot be made as readily as desired.

It is the general object of the present invention to provide an electrical heating panel assembly and, more particularly, a connection means which exhibits a high degree of ease and convenience in the on-site connection of panel cold leads and power line conductors, and which is yet highly reliable in its electrical insulating properties.

SUMMARY OF INVENTION

In fulfillment of the aforementioned object and in accordance with the present invention, a heating panel assembly which is of a relatively thin and generally planar configuration with at least one edge surface and opposite generally planar side surfaces is provided with a length of electrical resistance heating wire and with a pair of cold leads connected with the heating wire and projecting from the edge surface. An insulated multiple-conductor power line assembly extends along and adjacent the panel edge surface and has at least a portion of its outer insulation removed. Conventional means may be employed in connecting the cold leads respectively with a pair of the multiple power line conductors at the outer insulation free portion of the power line.

A closure member constructed in accordance with the invention takes a generally U-shaped configuration and may be of plastic or other insulating material. The member has a body portion and integral thin generally planar leg portions which are adapted respectively to slidably engage the opposite panel side surfaces and, in assembled position, the leg portions cooperatively embrace the heating panel adjacent the aforesaid edge surface. The body portion of the closure member is spaced from the edge surface of the panel and cooperates therewith to define an open end generally tubular enclosure for the insulation free portion of the power line, the cold leads, and the means connecting the power line conductors and the cold leads. An attachment means is provided for securing the closure member in its assembled position with its legs embracing the panel as described and, electrical insulating means is provided at least at the open ends of the tubular enclosure formed by the closure member and the panel edge surface.

In one embodiment of the invention, the electrical insulating means takes the form of a hardenable grout-like material which has a plastic state and which is introduced to the closure member in its plastic state so as to encapsulate and harden about the insulation free portion of the power line, the cold leads, and the connecting means. The ends of the closure member are thus closed electrically. The grout-like material may be disposed in the closure member in its plastic state in a conventional manner from a bulk container or, alternatively, the U-shaped closure member may contain the grout-like material in a sealed but readily rupturable container. On assembly of the closure member with the panel the container of grout-like material is ruptured and encapsulation of the power line portions, cold leads and connecting means occurs automatically.

In another form of the invention, the ends of the closure member are electrically closed or insulated by connecting conduit means therewith. That is, a conduit means which has an insulated multiple-conductor power line extending therewithin terminates at and extends outwardly from opposite ends of the closure member. The ends of the conduit means are in electrically insulating connection with the closure member at each end of the latter. Various means for connecting the conduit means to the closure member are of course available and include the direct adhesive connection of conduit means to closure member, a threaded connection, and connections employing various conventional adapters of the adhesive, threaded, and clamp type. Further, the conduit means may vary widely in form and may include several conventional types of conduit such as metallic conduit, plastic conduit, and well known helical or spiral conduit of the flexible type.

In a second form of the closure member a hinge means, preferably integral, is provided along a line parallel with the power line assembly so that the latter may be entered laterally or laid in the closure member in its open condition with the member thereafter closed along its hinge means to enclose the power line. The convenient application of grout in its plastic state is also provided for with the hinged closure member in its open condition.

The closure member in either form may be attached to the panel by various means with a simple screw connection presently preferred.

Finally, an integral abutment means is preferably provided for establishing the desired assembled position of the closure member relative to the edge surface of the associated panel.

DESCRIPTION OF PREFERRED EMBODIMENTS

Figure 1:
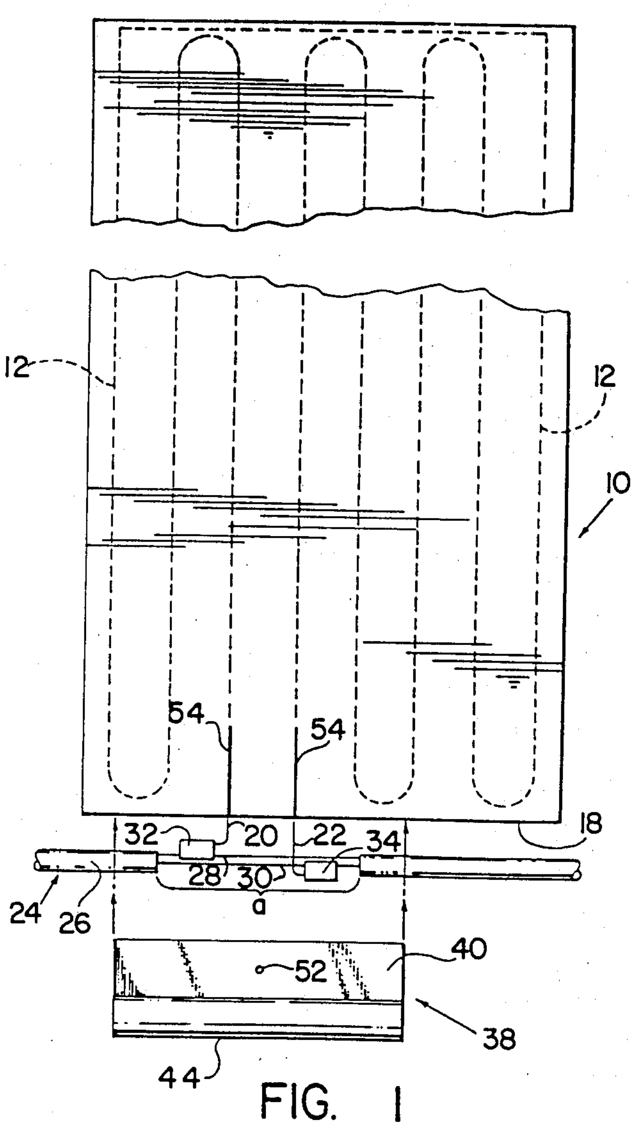
FIG. 1 is a top view of an electrical heating panel assembly of the present invention with a closure member in an unassembled position.

Referring particularly to FIG. 1, an electrical heating panel assembly shown therein comprises a heating panel 10 of generally rectangular form and which has resistance heating wire 12,12 embedded therein in a generally sinusoidal configuration. The panel has planar opposing or opposite side surfaces 14,16, FIG. 6, and an edge surface 18 through which cold leads or lead wires 20,22 project. The cold leads 20,22 are connected within the panel 10 with the resistance wire 12 and are supplied from an electrical power source, not shown, by means of an insulated multiple-conductor power line partially shown at 24.

Preferably, the power line 24 serves to connect a series of heating panels such as the panel 10 in parallel relationship. On-off operation of the panels for the control of heating within a room or zone may of course be provided for with conventional thermostatic means.

The power line 24 illustrated may be taken to be a conventional Romex cable but a wide variety of types of power lines are of course contemplated within the scope of the invention. The Romex cable shown has an outer insulation 26 which is removed over a portion a in FIG. 1 to expose insulated conductors 28,30. The conductors 28,30 are connected respectively with the leads 20,22 by small connectors 32,34 in FIG. 1.

Figure 2:
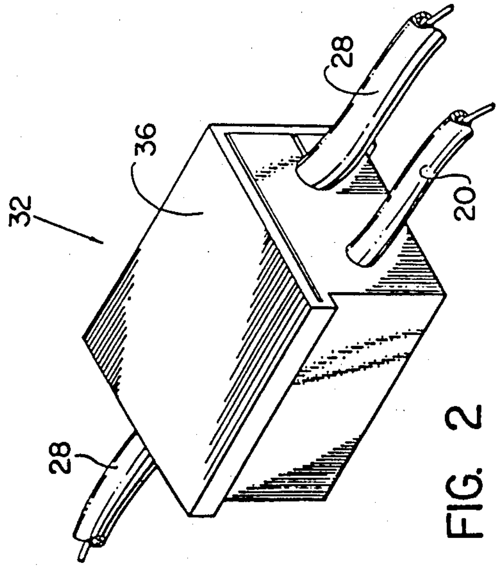
FIG. 2 is a perspective view showing a plastic connector element and associated sections of a power line conductor and a cold lead.

A wide variety of connection means may be employed for electrically connecting power line conductors and cold leads in accordance with the invention. The connector 32 best illustrated in FIG. 2, and also representing the connector 34, is of a conventional type and of a plastic construction with a hinged cover element 36. The cover element 36, shown in its closed position, may be opened for effecting an electrical connection between the power line conductor 28 and the cold lead 20. Small slidable interconnecting conductors within the connector pierce the insulation of the conductor 28 and the cold lead 20 whereby to effect the necessary electrical connection and are thereafter enclosed and insulated on closing of the cover 36. Connectors of this type are fast acting and dependable in use and are well suited to the desired ease and convenience in installation procedures.

Figure 3:
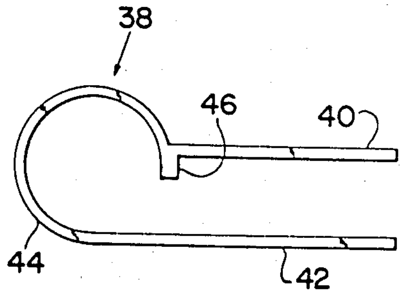
FIG. 3 is a side view of a generally U-shaped closure member.
Figure 6:
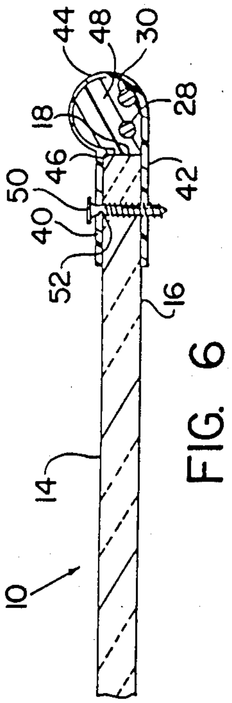
FIG. 6 is a sectional view taken generally as indicated at 6,6 in FIG. 5.

When the connectors 32,34 have been positioned as shown in FIG. 1 and the necessary connections made between the cold leads 20,22 and the power line conductors 28,30, the connections are ready for encapsulation by a closure member indicated generally at 38. The closure member 38, in accordance with the invention, takes a generally U-shaped configuration and has opposite parallel legs 40,42 which are generally planar and which are spaced apart to closely embrace an edge portion of the panel 10. That is, when the closure member 38 is moved into assembled position with panel 10 as indicated by the arrows in FIG. 1, the legs 40,42 thereof slide over and embrace the opposite side surfaces 14,16 of the panel as illustrated in FIG. 6. Preferably, and as best illustrated in FIG. 3 and 6, an abutment means is provided for limiting the movement of the legs 40,42 onto the panel so that a body portion 44 of the closure memeber is retained in spaced relationship with the panel edge 18. The abutment means may take the form of a rib 46 extending laterally of the leg 40 and internally thereof so as to engage the edge surface 18 as illustrated in FIG. 6. Further, it is the preferred practice to dimension and shape the legs 40,42 so that a slight press fit is provided for. That is, the legs may be slightly sprung apart as they are engaged with the side surfaces 14,16 so as to flex inwardly and effect a frictional retention of the closure member 38 in its assembled position as shown in FIGS. 5 and 6.

Figure 5:
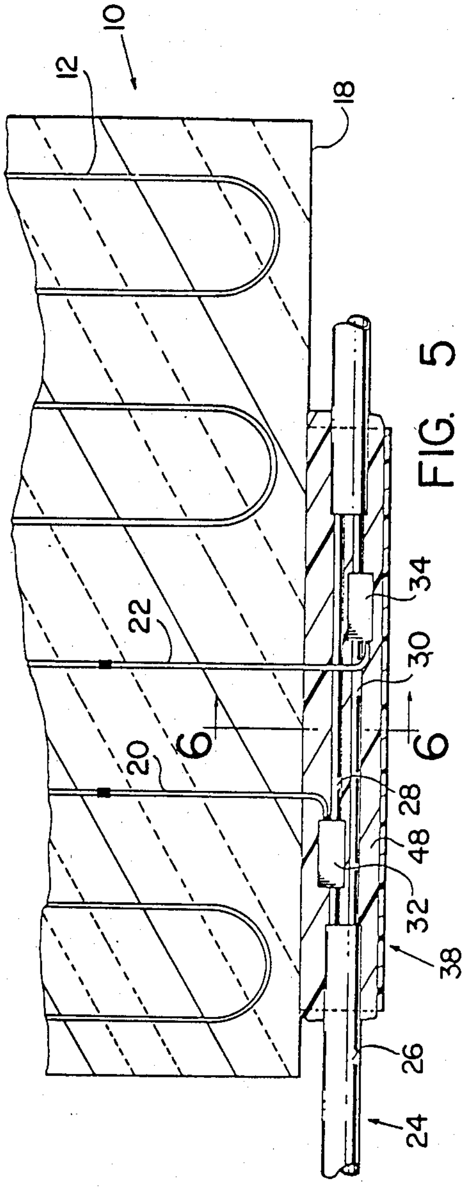
FIG. 5 is a fragmentary enlarged sectional view through a portion of an electrical heating panel, a closure member, and the electrical connections therewithin.

With the closure member 38 positioned as shown in FIGS. 5 and 6 a tubular enclosure is provided for the portion "a" of the power line 24, FIG. 1, the cold leads 20,22, and the connectors 32,34. As shown, the body portion 44 of the closure member is parti-cylindrical in cross section, but other configurations are contemplated within the scope of the invention. Insulating means in FIGS. 5 and 6 takes the form of a grout-like material having a plastic state and which is introduced to the interior of the closure member 38 in its plastic state so as to encapsulate the small insulated power line conductors 28,30, the cold leads 20,22, and the connectors 32,34. On hardening of the grout-like material, the aforesaid elements are permanently secured in position and insulated and the opposite ends of the closure member are closed and insulated as illustrated in FIG. 5. A wide variety of grout-like materials may be employed including the conventional grout-like material used in the installation of walls and ceilings of the gypsum wall board type. Obviously, the grout-like material may simply be taken from a bulk container and deposited in the closure member 38 prior to assembly.

An attachment means for securing the closure member 38 in its assembled position takes the form of a screw 50 in FIG. 6 and such means is presently preferred. Obviously, however, a wide variety of other means may be employed. The screw 50 is entered through a suitable opening 52 in the closure member 38, FIG. 1, and extends through the gypsum or other material of the panel 10 as illustrated. Preferably, the panel 10 is provided with indicia as as 54,54 FIG. 1 to designate a safe area of entry for the screw 50 between the cold leads 20,22.

Figure 7:
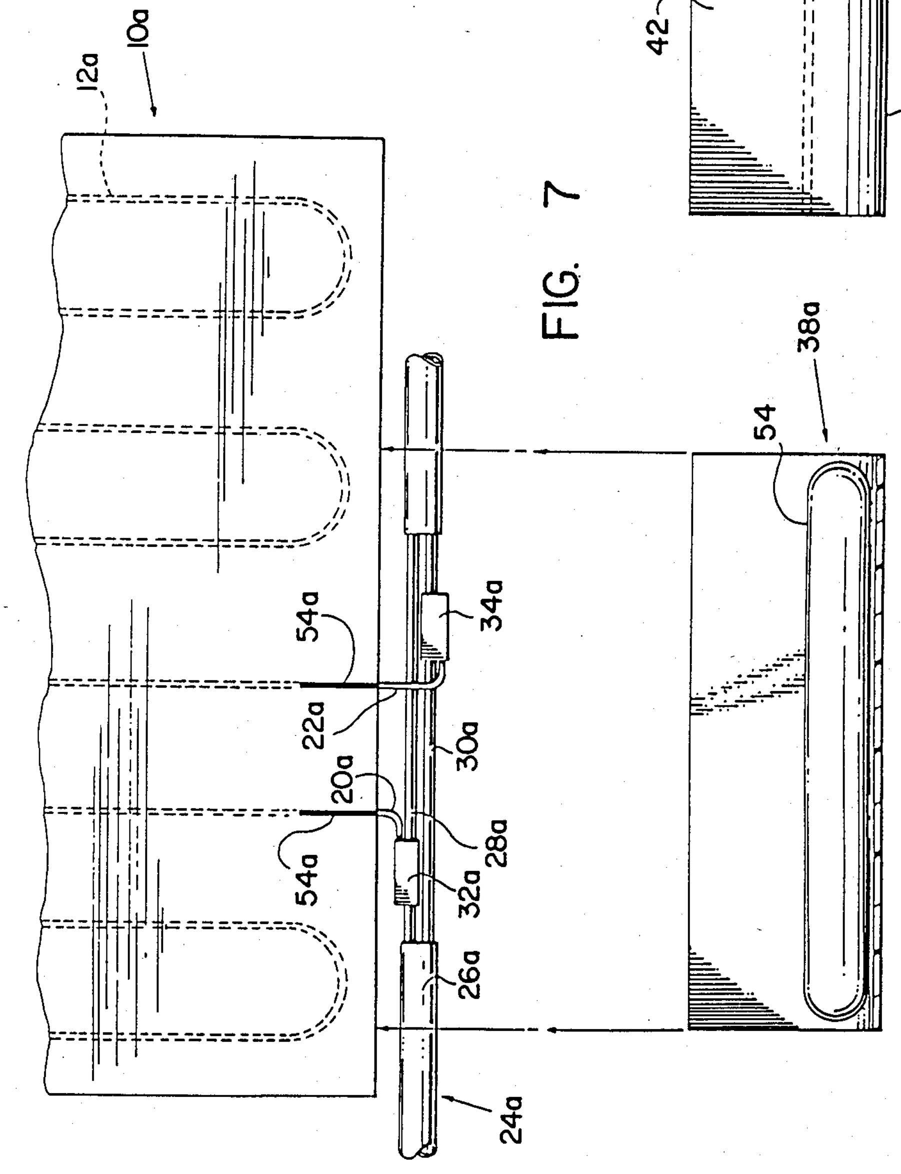
FIG. 7 is an enlarged view showing a portion of a heating panel, a closure member in section and in unassembled position, and power line and cold lead conductors.
Figure 4:
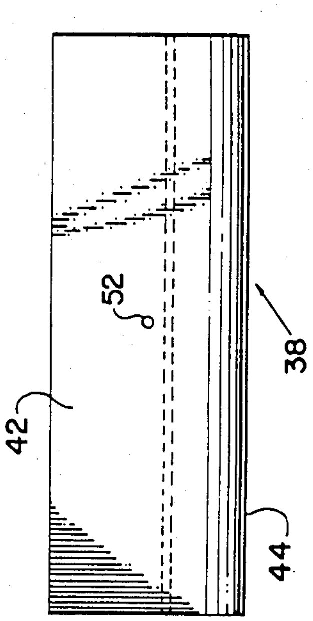
FIG. 4 is a bottom view of the closure member.

In FIG. 7, the elements shown and designated with reference numerals with the suffix "a" may be regarded as identical with those described above. The significant difference in FIG. 7 is in the provision of a rupturable container 54 containing grout-like material. The rupturable container or "sausage" 54 may be disposed within closure member **38*a* and may comprise a thin flexible plastic sheath containing grout-like material in a plastic state. A longitudinal slit in the container 54 prior to assembly of the closure member will of course result in the flow of the plastic grout-like material about the cold leads 20*a*,22*a*, connectors 32*a*,34*a*, and power line conductors 28*a*,30*a*. Thus, encapsulation of the elements will result in the manner illustrated in FIGS. 5 and 6**.

Figure 8:
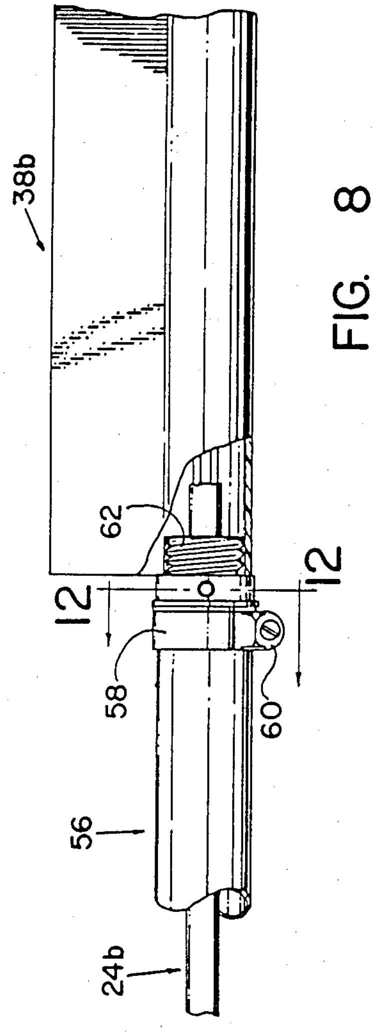
FIG. 8 is a fragmentary view partially in section and shows a portion of a closure member, a conduit means for a power line, and an adapter for connecting the conduit means to the closure member.

In FIG. 8 a closure member **38*b* has an associated conduit means 56 which may be of a conventional metallic construction and which receives a power line 24*b*. The power line 24*b* extends through the conduit 56 to the interior of the closure member 38*b* for connection with cold leads therewithin in the manner described above. At the opposite end of the closure member 38*b*, not shown, the conduit of course extends away from the closure means in a similar manner and, an adapter such as the adapter 58 may be provided at each end of the closure means. The adapter 58 is of a coventional type and includes a clamp means 60 for securing the adapter to the conduit 56. At an inner end portion a male threaded member 62 is received within an end portion of the closure member 38*b* and may be secured to the closure member by self threading or other means. For example, an adhesive may be employed in securing the threaded portion 62** within the closure member.

With the FIG. 8 arrangement, the grout-like material described above may be dispensed with and the opposite end portions of the closure member are nevertheless effectively insulated by the tight connection between the adapter, the closure member and the conduit about the power line.

Figure 9:
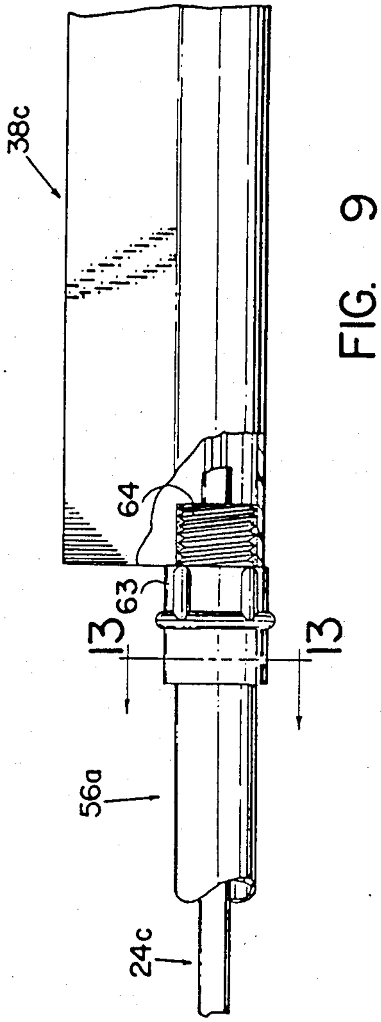
FIG. 9 is a fragmentary view partially in section showing a closure member, a conduit means, and a second adapter.
Figure 12:
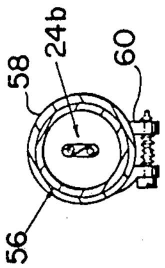
FIG. 12 is a sectional view taken generally as indicated at 12,12 in FIG. 8.
Figure 13:
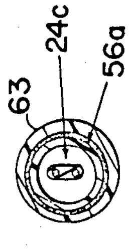
FIG. 13 is a sectional view taken generally as indicated at 13,13 in FIG. 9.

In FIG. 9 a closure member **38*c* has an associated conduit 56*a*, which may be similar to the conduit 56, and an adapter 63. The adapter 63 receives the conduit 56*a* at a left hand end portion and may be adhesively secured thereto. At a right hand end portion, a threaded male member 64 is received within the closure member 38*c*** and may be self threading or adhesively secured in the closure member.

Figure 10:
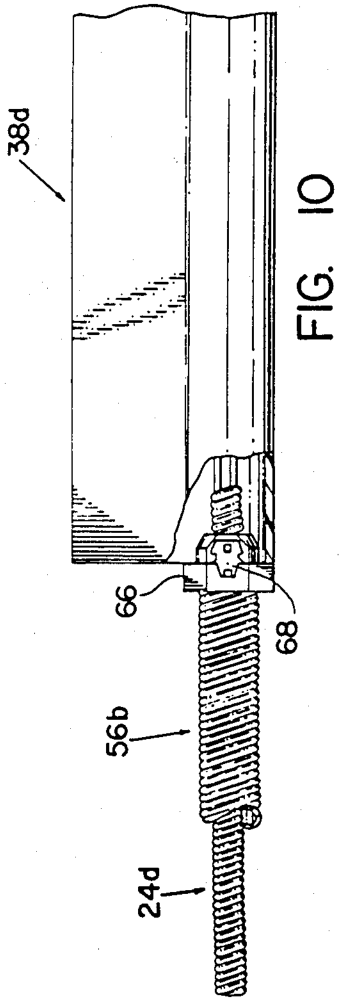
FIG. 10 is a fragmentary view partially in section similar to FIGS. 8 and 9 but showing a further form of conduit means and adapter.

In FIG. 10 a portion of a power line **24*d* may be of the conventional BX type within a similar helical or spiral flexible conduit 56*b*. The conduit 56*b* is secured to a closure member 38*d* by means of an adapter 66 which may be internally threaded to receive an end portion of the conduit 56*b* and which has a small clip 68 engageable with an interior wall surface in a closure member 38*d*. The clip 68 carries a sharp edged prong member for retention within the closure member 38*d***.

Figure 11:
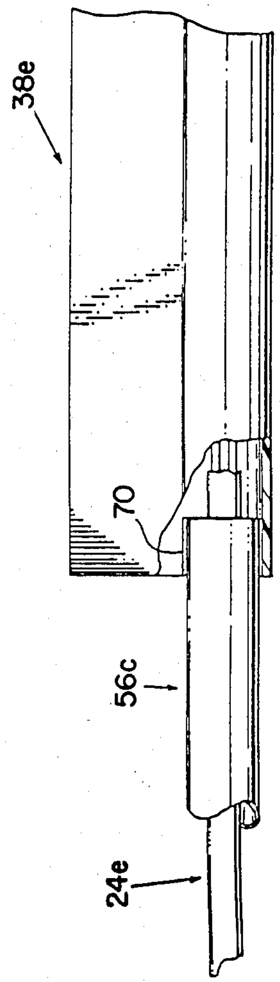
FIG. 11 is a fragmentary view partially in section similar to FIGS. 8–10 but showing a variant form of connection between a conduit means and a closure member.

In FIG. 11 a conduit **56*c* receives a Romex type power line 24*e* and is preferably of a plastic material for adhesive direct connection with the interior wall surface of closure member 38*e* at 70**.

Figure 15:
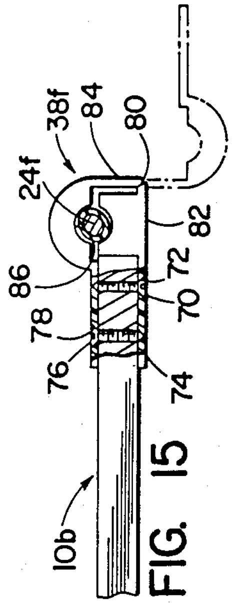
FIG. 15 is a side view of the hinged closure member mounted on a panel edge portion with the member also shown in broken line in its open position.
Figure 16:
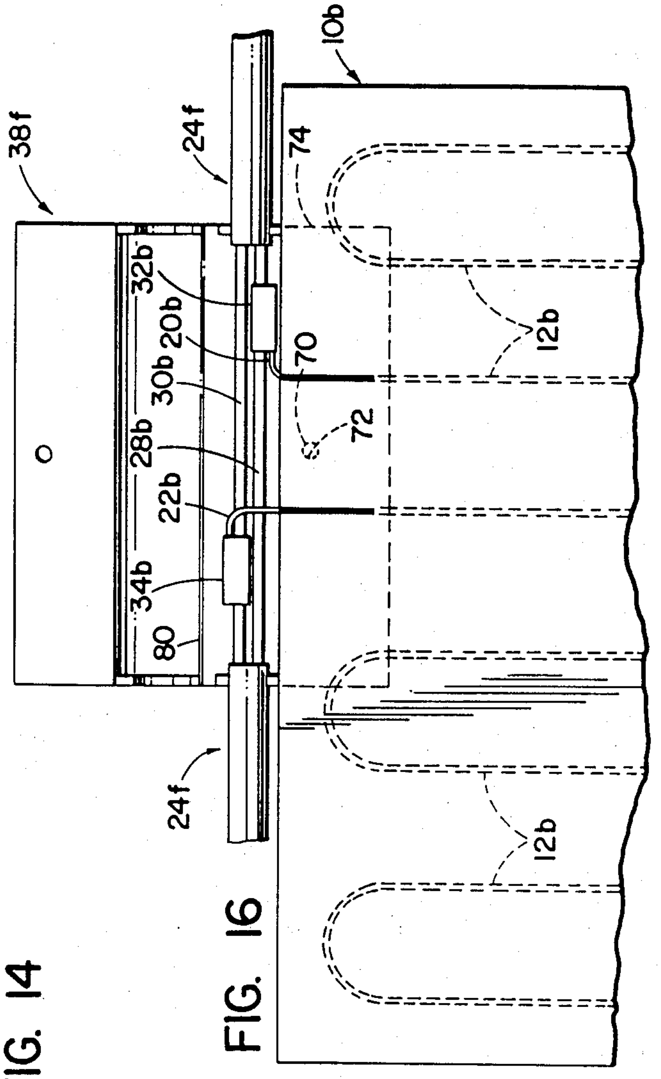
FIG. 16 is a top view of a portion of a heating panel with hinged closure member ready for mounting on its edge portion but in an open condition.
Figure 14:
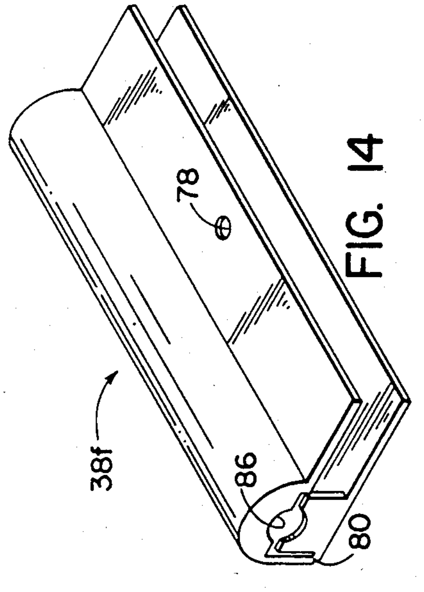
FIG. 14 is a perspective view of a hinged form of the closure member of the invention.

In FIGS. 14 through 16 a closure member **38*f* is provided with a hinge means which extends along a line parallel to the power line assembly associated with the member. Thus, in FIG. 16 power line 24*f* extends along the edge of an electric heating panel 10*b* with a portion of its outer insulation stripped to expose lines 28*b* and 30*b* connected respectively with cold leads 20*b* and 22*b* by small connectors 32*b* and 34*b*. With the hinged closure member 38*f* in its open position as shown in FIG. 16, and in phantom in FIG. 15, the power line assembly may be entered laterally or laid in the closure member in the FIG. 16 position and the connections with the cold leads on lead lines may be effected either prior to or subsequent to the entry of the power line into the closure member. A lower mounting screw 70, FIG. 15, may be entered through a suitable opening 72 in lower leg 74 of the closure member to secure the member to the panel 10*b* in the FIG. 16 and FIG. 15** phantom position.

The introduction of grout or the like for encapsulation of the electrical connections is also facilitated with the hinged closure member **38*f*. As will be apparent, the introduction of plastic grout between the legs of the closure members 38–38*e*, or, alternatively into the ends of the body positions thereof, can be a difficult and rather tedious task. With the hinged member 38*f* of FIGS. 14–16 in its open condition as in FIG. 15 (phantom) and FIG. 16, there is of course no difficulty whatever in merely depositing a quantity of plastic grout from a trowel or the like on and about the exposed electrical connections. The member may then be closed as illustrated in FIG. 14 and FIG. 15 (solid line) and the body portion thereof will be filled with grout effectively encapsulating the electrical connections therewithin. A second mounting screw 76 may be provided as best illustrated in FIG. 15 to project through a suitable opening 78 and to secure the closure member in its closed position and in assembly with the panel 106**.

The specific configuration of the hinged closure member **38*f* may vary substantially but the member is preferably constructed of a plastic material with an integral hinge as shown at 80. The hinge 80 extends along a corner which is defined by walls 82, 84 which are preferably generally perpendicular as shown and which form a bottom wall and a side wall respectively of the body portion of the closure member. The top part of the body portion of the closure member is parti-cylindrical and, as shown, semi-cylindrical. Further, the closure member has similar end walls 82, 84 at opposite ends of the body portion which cooperatively define substantially circular openings at 86 in FIGS. 14 and 15. The openings 86,86 at each end of the body portion receive and approximately fit the power line 24*f*** as shown.

As will be apparent, various methods may be employed for insulating the connections within closure members such as **38–38*f***. Grout encapsulation is preferred in the absence of a conduit such as illustrated in FIGS. 8–11. When a conduit is employed, the opposite ends of the closure member are insulated thereby through direct connection or through the use of suitable adapters. In any event, the connections within the closure member are effectively insulated from their environment and the installation of the electric heating panels may be accomplished with a high degree of ease and convenience.

I claim:

1. An electrical heating panel assembly comprising a relatively thin and generally planar panel having at least one edge surface and opposite side surfaces which are generally planar and which intersect said edge surface substantially at right angles, said panel carrying a length of electrical resistance heating wire and a pair of cold leads connected with the heating wire and projecting from said edge surface, an insulated multiple-conductor power line assembly extending along and adjacent said panel edge surface and having at least a portion of its outer insulation removed, means connecting said cold leads respectively with a pair of said multiple power line conductors at said outer insulation free portion of said power line, a generally U-shaped multi-purpose closure member having an enlarged parti-cylindrical body portion with a gap approximately equal to the thickness of the panel edge surface, and integral thin generally planar and parallel leg portions adapted respectively to slidably engage said opposite panel side surfaces and in assembled position to cooperatively embrace the heating panel adjacent said edge surface, the parti-cylindrical body portion of the closure member being spaced from the edge surface of the panel and cooperating therewith to define an open end substantially cylindrical tubular enclosure with said edge surface substantially completing said cylindrical configuration, said enclosure being adapted to receive said outer insulation free power line portion, said cold leads, and said connecting means, attachment and abutment means for securing and positioning said closure member in assembly with its legs embracing the panel and with its body defining a substantially cylindrical enclosure in cooperation with the panel edge surface, and means for electrically insulating at least each of the open ends of said cylindrical tubular enclosure formed by said closure member and panel edge surface.

2. An electrical heating panel assembly as set forth in claim 1 wherein said electrical insulating means takes the form of a hardenable grout-like material having a plastic state and which is introduced in said state so as to encapsulate and harden about said insulation free power line portion, said cold leads, and said connecting means within said tubular enclosure and also to close the ends of said enclosure.

3. An electrical heating panel assembly as set forth in claim 2 wherein said grout-like material is air hardenable and is introduced to said U-shaped closure member in a sealed but readily rupturable container prior to assembly of said member with said panel, said material on rupture of its container and assembly of the enclosure member with the panel serving to encapsulate said insulation free power line portion, said cold leads and said connecting means as aforesaid.

4. An electrical heating panel as set forth in claim 1 wherein said power line assembly comprises a conduit means and an insulated multiple conductor power line extending therewithin and having its insulation removed within the closure member, the conduit means terminating at and extending outwardly from opposite ends of the closure member, and the ends of the conduit means being in electrically insulating connection with the closure member at each end of the latter.

5. An electrical heating panel assembly as set forth in claim 4 wherein said closure member has a parti-cylindrical body portion open at its ends, wherein said power line assembly includes a pair of open tubular adapters entered and secured respectively in opposite ends of said parti-cylindrical body portion of the closure member, and wherein said ends of said conduit means are connected respectively with said adapters, said insulated power line extending within and through said conduit means, adapters, and closure member with the insulation free portion thereof residing within said member.

6. An electrical heating panel assembly as set forth in claim 5 wherein said adapters are threadably engaged with said closure member.

7. An electrical heating panel assembly as set forth in claim 5 wherein said adapters are adhesively secured to said closure member.

8. An electrical heating panel assembly as set forth in claim 5 wherein said adapters include clamp means for securing end portions of said conduit means thereto.

9. An electrical heating panel assembly as set forth in claim 5 wherein said adapters are adhesively secured to said end portions of said conduit means.

10. An electrical heating panel assembly as set forth in claim 5 wherein said adapters and said end portions of said conduit means are threadably connected together.

11. An electrical heating panel assembly as set forth in claim 5 wherein said conduit means is contructed of a plastic material.

12. An electrical heating panel assembly as set forth in claim 5 wherein said conduit means is of metallic construction.

13. An electrical heating panel assembly as set forth in claim 5 wherein said conduit means is of flexible metallic construction.

14. An electrical heating panel assembly as set forth in claim 1 wherein said attachment means for securing said closure member in assembled position on said panel takes the form of at least one screw entered through a suitable opening in the closure member and threadably engaged with the panel.

15. An electrical heating panel assembly as set forth in claim 14 wherein said panel is provided with indicia of a safe area of insertion for the enclosure member attachment screw.

16. An electrical heating panel assembly as set forth in claim 1 wherein said closure member is provided with a hinge means along a line parallel with the power line assembly associated therewith, said hinge means providing for the opening of the closure member and the convenient laying in of the power line assembly with the insulation free portion thereof disposed in the closure member so as to be enclosed thereby on closing of the member along the line of its hinge means.

17. An electrical heating panel assembly as set forth in claim 16 wherin said hinge means is formed integrally along a line generally opposite the leg portions of the closure member.

18. An electrical heating panel assembly as set forth in claim 17 wherein the parti-cylindrical body portion of the closure member is substantially semi-cylindrical with one part forming a generally perpendicular corner with the hinge line extending therealong.

19. An electrical heating panel assembly as set forth in claim 17 wherein end walls are provided at opposite ends of the closure member and define substantially circular openings sized to receive and approximately fit the power line assembly with its outer insulation in place.

20. An electrical heating panel assembly as set forth in claim 17 wherein the closure member is of a plastic material.

* * * * *